(12) United States Patent
Chuang

(10) Patent No.: US 6,962,251 B1
(45) Date of Patent: Nov. 8, 2005

(54) FINISHED PRODUCT RECEIVING SYSTEM FOR USE WITH A METAL SHEET MEMBER PROCESSING MACHINE

(76) Inventor: Sen-Jung Chuang, No. 90-10, Hsia Kwei Jou San, Tan Shui Chen, Taipei Hsien (TW)

( * ) Notice: Subject to any disclaimer, the term of this patent is extended or adjusted under 35 U.S.C. 154(b) by 0 days.

(21) Appl. No.: 10/902,025

(22) Filed: Jul. 30, 2004

(51) Int. Cl.$^7$ .............................................. B65G 37/00
(52) U.S. Cl. ................. 198/600; 198/468.2; 198/468.9
(58) Field of Search .......................... 198/468.2, 468.9, 198/861.1, 600

(56) References Cited

U.S. PATENT DOCUMENTS

| | | | | |
|---|---|---|---|---|
| 4,711,342 A | * | 12/1987 | Abraham .................. | 198/463.3 |
| 5,788,483 A | * | 8/1998 | Drigani et al. .............. | 432/122 |
| 6,003,655 A | * | 12/1999 | Tanaka et al. .............. | 198/409 |
| 6,231,298 B1 | * | 5/2001 | Heston ..................... | 414/751.1 |
| 6,287,066 B1 | * | 9/2001 | Heinz et al. .................. | 414/13 |

* cited by examiner

*Primary Examiner*—Joe Dillon, Jr.
(74) *Attorney, Agent, or Firm*—Troxell Law Office, PLLC

(57) ABSTRACT

A finished product receiving system is disclosed to include an elongated rack body with rollers, terminals arranged in parallel at one lateral side of the rack body, a driving rod, a plurality of links coupled between the driving rod and the rollers, a master air cylinder controlled to move the driving rod to further force the links to bias the rollers of the elongated rack body between the operative position for receiving finished metal sheet members from a metal sheet member processing machine and the non-operative position for enabling received finished metal sheet members to fall to the terminals, and auxiliary air cylinders respectively installed in the terminals and controlled to move a respective piston rod between the extended position for receiving finished metal sheet members from the rollers of the rack body and the received position for moving collected finished metal sheet members from the front side of the terminals to the rear side for further delivery.

3 Claims, 8 Drawing Sheets

US 6,962,251 B1

FINISHED PRODUCT RECEIVING SYSTEM FOR USE WITH A METAL SHEET MEMBER PROCESSING MACHINE

BACKGROUND AND SUMMARY OF THE INVENTION

The present invention relates to a metal sheet member processing machine and more particularly, to a finished product receiving system for use with a metal sheet member processing machine.

A metal sheet member processing machine generally has the outside side provided with a finished product receiving rack adapted to receive finished products. A finished product receiving rack for this purpose comprises a plurality of rollers for guiding finished products toward the rear side. Workers pick up finished products from the finished product receiving rack and arrange finished products in stacks for delivery. This finished products arrangement method requires much labor and wastes much time.

The present invention has been accomplished under the circumstances in view. It is therefore the main object of the present invention to provide a finished product receiving system for use with a sheet member processing machine, which saves much labor and time in collection of finished products.

To achieve this and other objects of the present invention, the finished product receiving system is used with a metal sheet member processing machine for receiving finished products, comprising an elongated rack body with rollers, terminals arranged in parallel at one lateral side of the rack body, a driving rod, a plurality of links coupled between the driving rod and the rollers, a master air cylinder controlled to move the driving rod to further force the links to bias the rollers of the elongated rack body between the operative position for receiving finished metal sheet members from a metal sheet member processing machine and the non-operative position for enabling received finished metal sheet members to fall to the terminals, and auxiliary air cylinders respectively installed in the terminals and controlled to move a respective piston rod between the extended position for receiving finished metal sheet members from the rollers of the rack body and the received position for moving collected finished metal sheet members from the front side of the terminals to the rear side for further delivery. Further, the terminals each have mounting lugs provided at two sides for mounting.

DETAILED DESCRIPTION OF THE INVENTION

Figure 1:
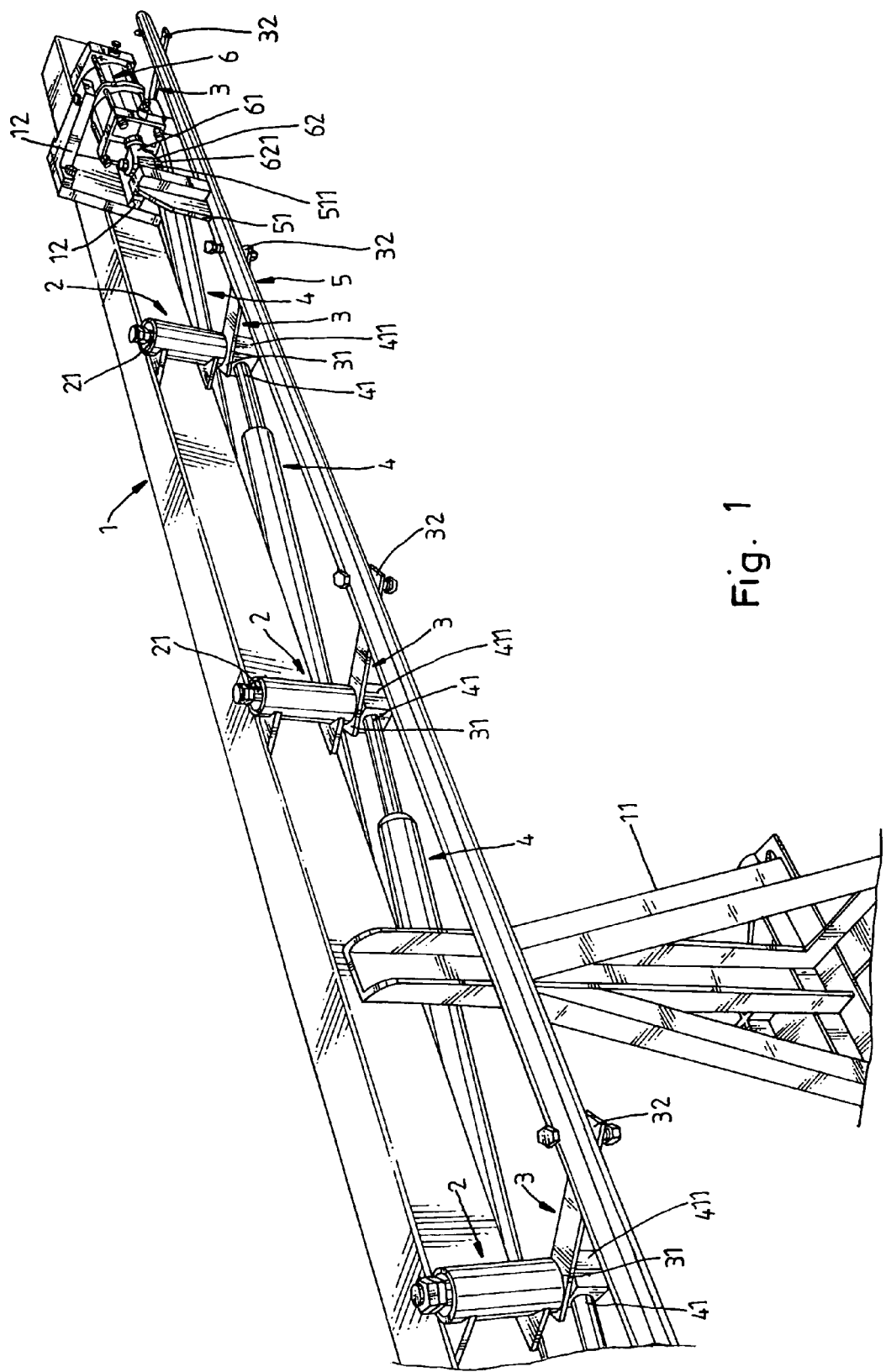
FIG. 1 is a perspective view of a finished product receiving rack the present invention, showing the rollers set in the non-operative position.
Figure 2:
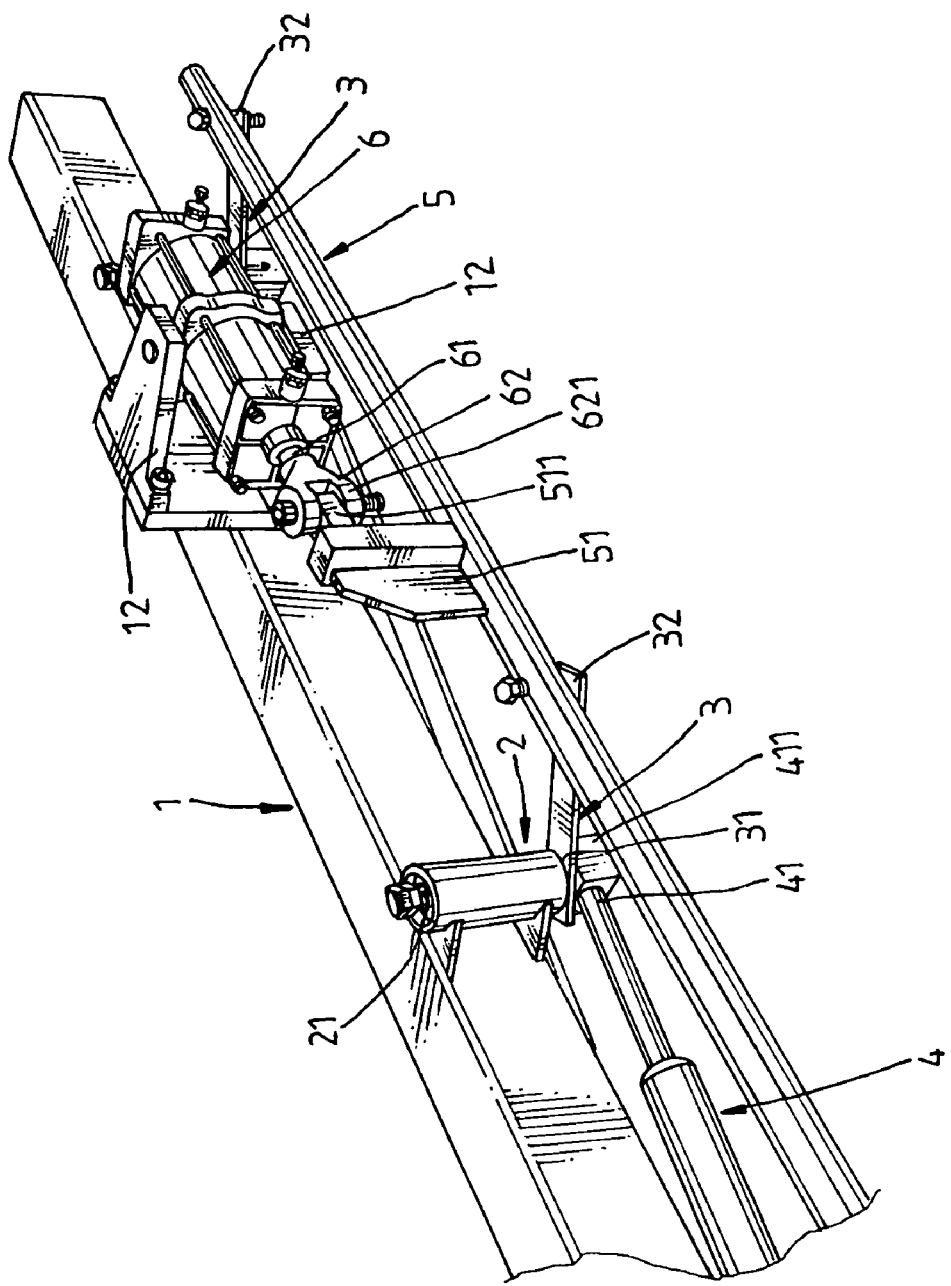
FIG. 2 is an enlarged view of a part of FIG. 1.
Figure 3:
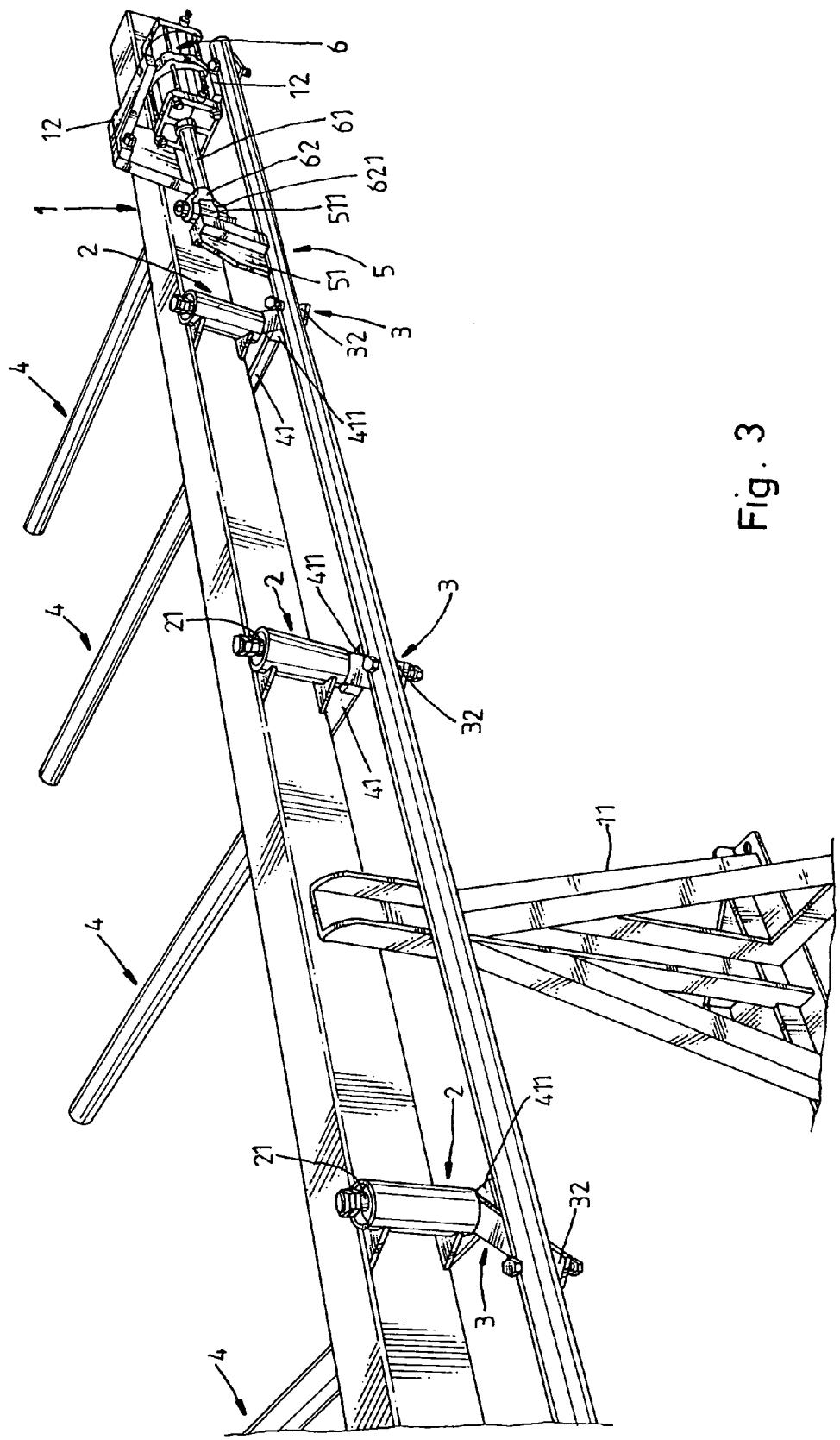
FIG. 3 is similar to FIG. 1 but showing the rollers set in the operative position.
Figure 4:
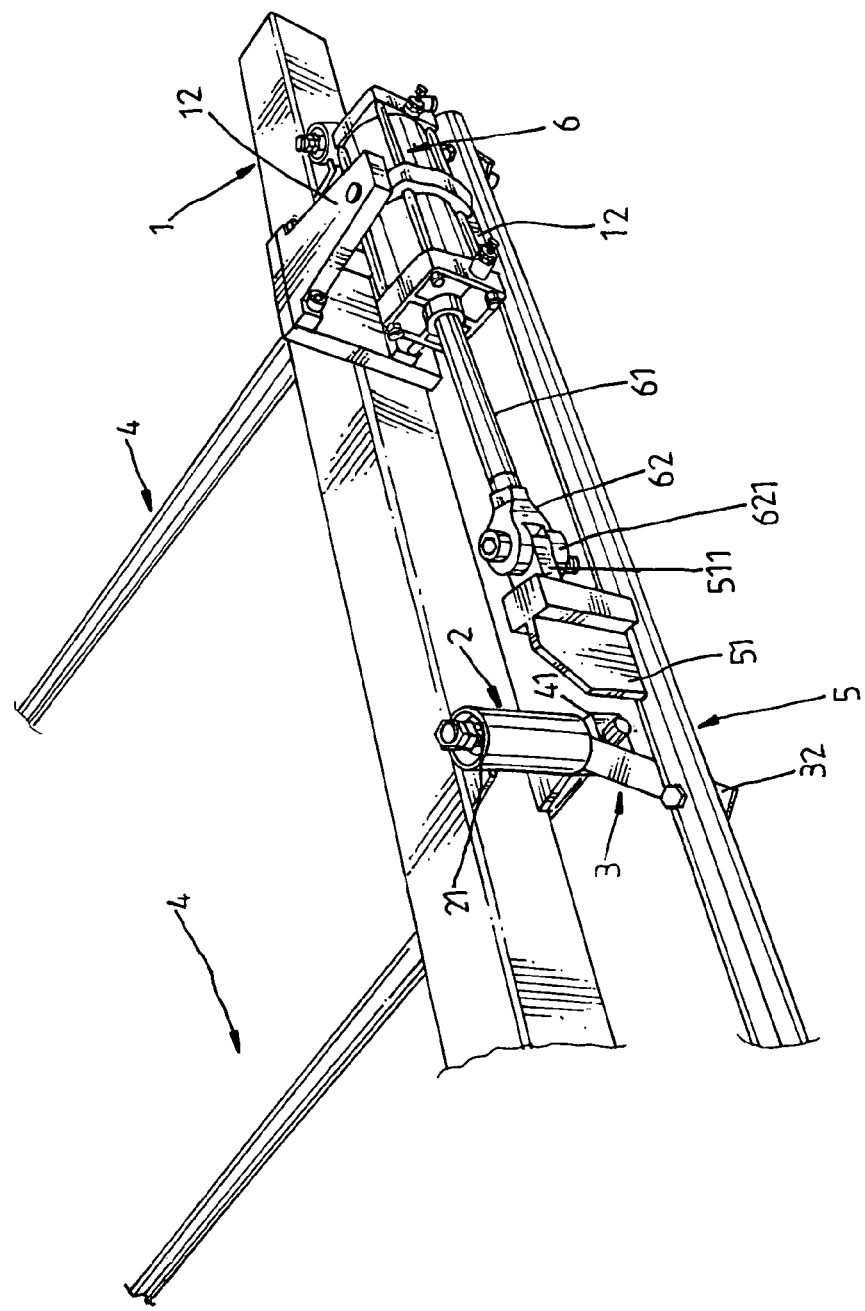
FIG. 4 is an enlarged view of a part of FIG. 3.
Figure 5:
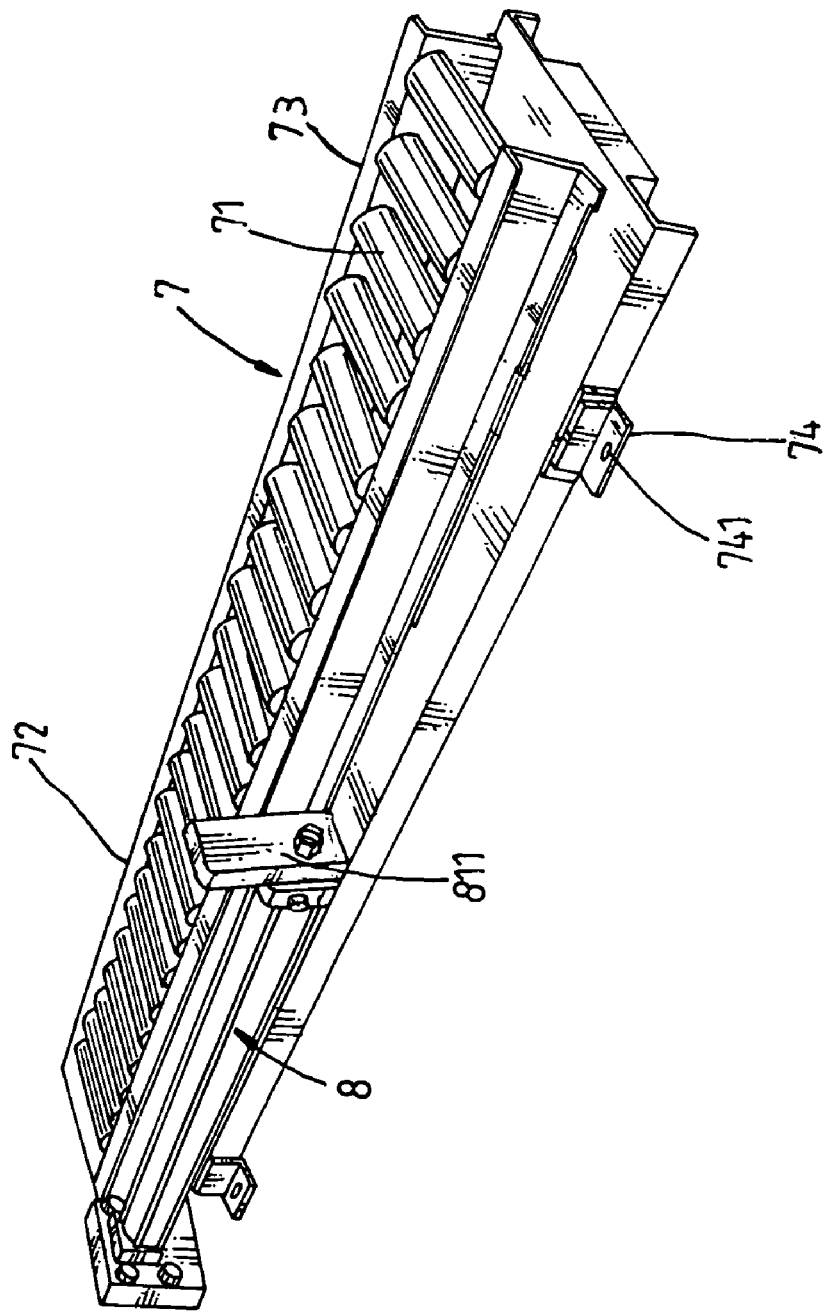
FIG. 5 is a perspective view of one terminal showing the piston rod of the air cylinder set in the received position.
Figure 6:
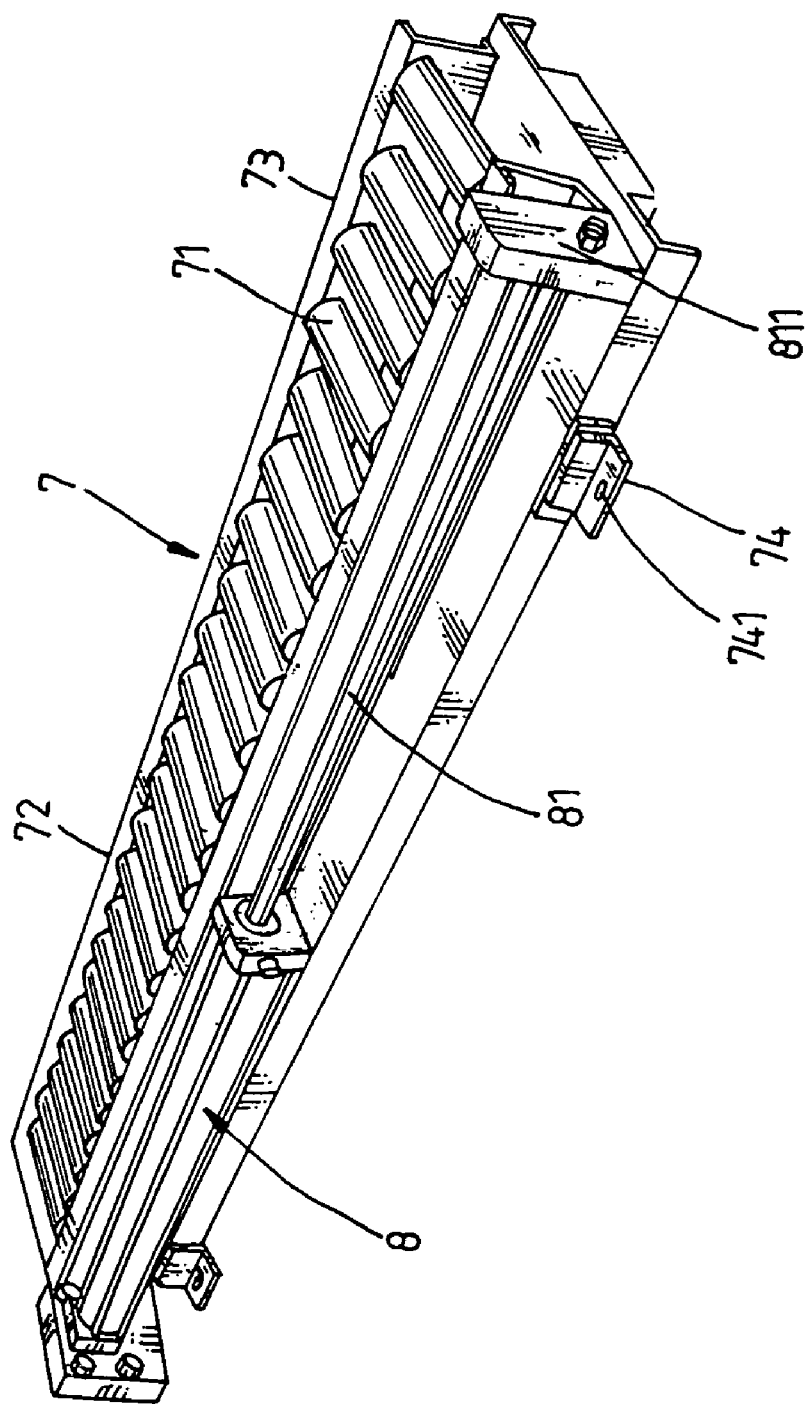
FIG. 6 is similar to FIG. 5 but showing the piston rod of the air cylinder set in the extended position.
Figure 7:
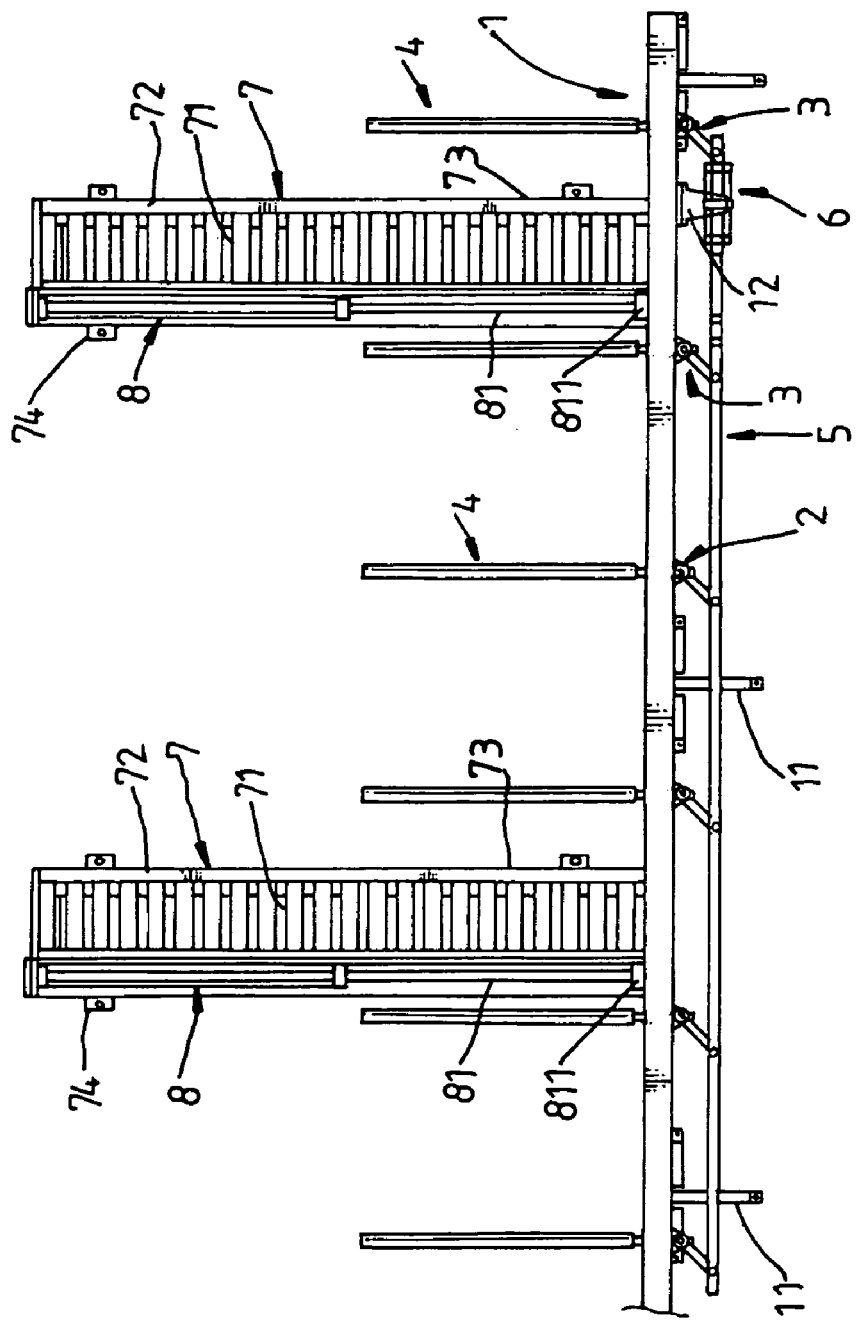
FIG. 7 is a top view of the finished product receiving system according to the present invention, showing the piston rods of the air cylinders of the terminals set in the extended position.

Referring to FIGS. 1–8, a finished product receiving system in accordance with the present invention is shown comprising a finished product receiving rack. The finished products receiving rack is comprised of an elongated rack body 1, a plurality of axle holders 2, a plurality of links 3, a plurality of roller shafts 41, a plurality of rollers 4, a driving rod 5, and an air cylinder 6.

The rack body 1 comprises a plurality of legs 11 standing on the floor, and a bracket 12 provided at one lateral side near the front end and adapted to support the air cylinder 6.

The axle holders 2 are fixedly fastened to the rack body 1 at one lateral side and equally spaced along the length of the rack body 1, each holding a respective pivot axle 21.

The links 3 each have a first end 31 respectively coupled to the pivot axles 21 of the axle holders 2, and a second end 32 respectively coupled to the driving rod 5.

The roller shafts 41 each have a coupling block 411 fixedly provided at one end and respectively coupled to the first end 31 of each of the links 3 and the pivot axles 21 of the axle holders 2.

The rollers 4 are tubular members respectively rotatably sleeved onto the roller shafts 41.

The driving rod 5 comprises a plurality of top frame 51 that supports the driving rod 5 on the rack body 1, for enabling the driving rod 5 to be moved axially forwards/backwards in the rack body 1.

The air cylinder 6 is controlled to move a piston rod 61 between the extended position and the received position. The piston rod 61 has a front end fixedly mounted with an end member 62, which has a forked lug 621 coupled to a connecting rod 511 at one top frame 51 of the driving rod 5.

Figure 8:
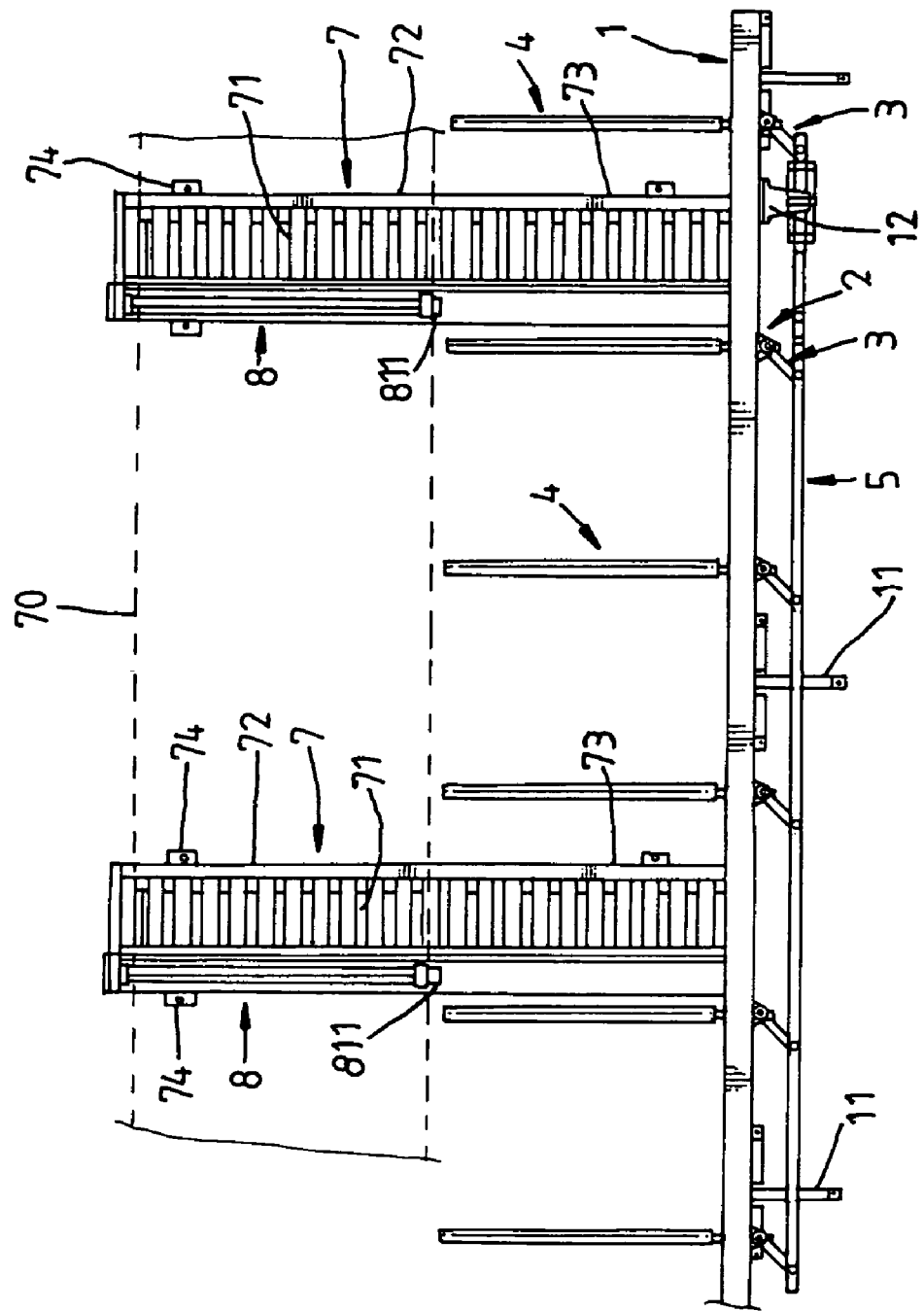
FIG. 8 corresponds to FIG. 7, showing the piston rods of the air cylinders of the terminals moved to the received position.

The finished product receiving system further comprises a plurality of terminals 7 arranged in parallel at one lateral side of the rack body 1 in transverse direction, having a length greater than the combined width of two finished products 70 (see FIG. 8). Each terminal 7 comprises a plurality of rollers 71 transversely arranged in parallel along the length, and an air cylinder 8 longitudinally arranged at one lateral side. The air cylinder 8 is controlled to move a piston rod 81, which has a stop plate 811 fixedly provided at the free end. The piston rod 81 is axially movable between the extended position (see FIG. 6) and the received position (see FIG. 5).

When extended out the piston rod 61 of the air cylinder 6 of the finished product, the driving rod 5 is moved forwards, thereby causing the links 3 to bias the roller shafts 41 and the rollers 4 to the operative position where the roller shafts 41 and the rollers 4 extend perpendicular to the rack body 1. On the contrary, when received the piston rod 61 of the air cylinder 6 of the finished product, the driving rod 5 is moved backwards, thereby causing the links 3 to reverse the roller shafts 41 and the rollers 4 to the non-operative position where the roller shafts 41 and the rollers 4 are received to the inside of the rack body 1.

When the roller shafts 41 and the rollers 4 are set in the operative position, finished products 70 are delivered one after another from the metal sheet member processing machine (not shown) to the finished product receiving rack and then guided forwards by the rollers 4. When one finished product 70 is carried to a predetermined location by the rollers 4, the air cylinder 8 of each terminal 7 is controlled to extend out the piston rod 81, and the air cylinder 6 of the finished product receiving rack is controlled to receive the piston rod 61 and to further bias the roller shafts 41 and the rollers 4 to the non-operative position, for enabling the finished product 70 to fall to the front side 73 of the terminals 7 (see FIG. 7). Thereafter, the air cylinder 6 of the finished product receiving rack is controlled to extend out the piston rod 61 and to further bias the roller shafts 41 and the rollers 4 to the operative position for receiving a nest finished product 70. After a certain number of finished products 70 have be accumulated at the terminals 7, the air cylinder 8 of each terminal 7 is controlled to receive the piston rod 81, causing the stop plate 811 to move the accumulated stack of finished precuts 70 along the terminals 7 from the front side 73 to the rear side 72 (see FIG. 8) for further delivery by a lift truck or the like. Thereafter, the air cylinder 8 is controlled to extend the piston rod 81 again for further finished product collection operation.

Further, the coupling block 411 of each roller shaft 41 has the top pivotally coupled to the first end 31 of the respective link 3 at an angle about 45°. Each terminal 7 has a plurality of mounting lugs 74 symmetrically provided at the two opposite lateral sides for connection to other machinery or support means. The mounting lugs 74 each have a mounting through hole 741 for mounting.

While only one embodiment of the present invention has been shown and described, it will be understood that various modifications and changes could be made thereunto without departing from the spirit and scope of the invention disclosed.

What is claimed is:

1. A finished product receiving system used with a metal sheet member processing machine for receiving finished metal sheet members, comprising:
    an elongated rack body, said elongated rack body comprising a plurality of legs standing on the floor, and a bracket provided at one lateral side near a front end thereof;
    a plurality of axle holders fixedly fastened to said elongated rack body at one lateral side and equally spaced along the length of said elongated rack body, said axle holders each holding a respective pivot axle;
    a driving rod longitudinally mounted in said elongated rack body and axially movable forwards/backwards, said driving rod having a fixed top frame;
    a plurality of links respectively coupled to said pivot axles of said axle holders and said driving rod;
    a plurality of roller shafts respectively coupled to said links and said pivot axles of said axle holders;
    a plurality of master rollers respectively rotatably sleeved onto said roller shafts;
    a master air cylinder mounted in said bracket inside said elongated rack body, said master air cylinder having a piston rod coupled to the top frame of said driving rod and movable between an extended position where said driving rod is moved forwards to force said links to bias said roller shafts and said master rollers to an operative position extending perpendicular to said elongated rack body and a received position where said driving rod is moved backwards to force said links to bias said roller shafts and said master rollers to a non-operative position extending in parallel to said elongated rack;
    a plurality of terminals arranged in parallel at one lateral side of said elongated rack body in transverse direction perpendicular to said elongated rack body for receiving finished product carried by said master rollers, said terminals each comprising a plurality of auxiliary rollers transversely arranged in parallel; and
    a plurality of auxiliary air cylinders respectively longitudinally mounted in said terminals, said auxiliary air cylinders each comprising a piston rod and a stop plate fixedly provided at an outer end of the piston rod, said auxiliary air cylinders being controlled to move the respective piston rod and said stop plate between an extended position where said stop plate is suspended below said elongated rack body for receiving finished products from said master rollers and a received position where said stop plate moves received finished product from a front side of said terminals to a rear side thereof.

2. The finished product receiving system as claimed in claim 1, wherein said roller shafts each have a coupling block pivotally coupled to one end of the respective link at an angle about 45°.

3. The finished product receiving system as claimed in claim 1, wherein said terminals each comprises a plurality of mounting lugs symmetrically provided at two opposite lateral sides, said mounting lugs each having a mounting through hole for mounting.

* * * * *